Sept. 3, 1957  L. W. BARBER  2,805,097
SLIDING WINDOW ADAPTER

Filed Jan. 26, 1955  2 Sheets-Sheet 1

Leo W. Barber
INVENTOR

BY Loya J. Miller
ATTORNEY

Sept. 3, 1957     L. W. BARBER     2,805,097
SLIDING WINDOW ADAPTER

Filed Jan. 26, 1955     2 Sheets-Sheet 2

Leo W. Barber
INVENTOR

BY Loyd J. Miller
ATTORNEY

United States Patent Office 2,805,097
Patented Sept. 3, 1957

2,805,097
SLIDING WINDOW ADAPTER
Leo W. Barber, Oklahoma City, Okla.
Application January 26, 1955, Serial No. 485,371
1 Claim. (Cl. 296—47)

The present invention relates to automotive window construction and more particularly to a device for installing sliding glass panels in the window opening of trucks or the like.

On some trucks, particularly power-driven winch trucks as used in transporting heavy equipment, it is desirable to have an openable rear window for receiving or giving instructions. A further advantage of the openable rear window is to permit the truck driver to reach therethrough to manually move certain levers in connection with the winch construction. In warm weather this opening aids in ventilating the truck cab. These opening windows are presently arranged by replacing the stationary rear window glass with a pair of panes of glass retained within the window opening by a commercially available glass-run channel installed on the pinch weld of the window opening which permits one or both of the panes of glass to slide past the other one.

The principal objection to this type of installation is that a water tight seal around the window is hard to maintain. However, there has been recently made available, commercially, a rubber glass-run channel which will maintain a permanent water tight seal around the window when properly installed. Some difficulty has been encountered in installing this type of glass-run channel due to the small radius of the corners of the window opening, resulting in the channel buckling at the corners and failing to seal water tight with the pinch weld of the truck cab.

The present invention overcomes these objections by providing a comparatively thin strip of material having a contour lying in substantially contiguous contact with the edge of the pinch weld and having an inner edge which permits the installation of a conventional rubber glass-run channel on its inwardly disposed edge without buckling the channel.

Therefore it is the primary object of this invention to provide a device which will be water tight and which may be used in a conventional rear window opening to lengthen the radius of corners thereof.

Another object is to provide a device of this class which will be water tight and which may be used on any conventional opening without altering the construction thereof.

A further object is to provide a device of this class which may be used to install a glass-run channel which may be readily installed within the window opening without the use of special tools for attaching the device.

Other objects will be apparent from the following description when taken in conjunction with the accompanying two sheets of drawings, wherein.

Like characters of reference designate like parts in those figures of the drawings in which they occur.

In the drawings.

Figure 1:
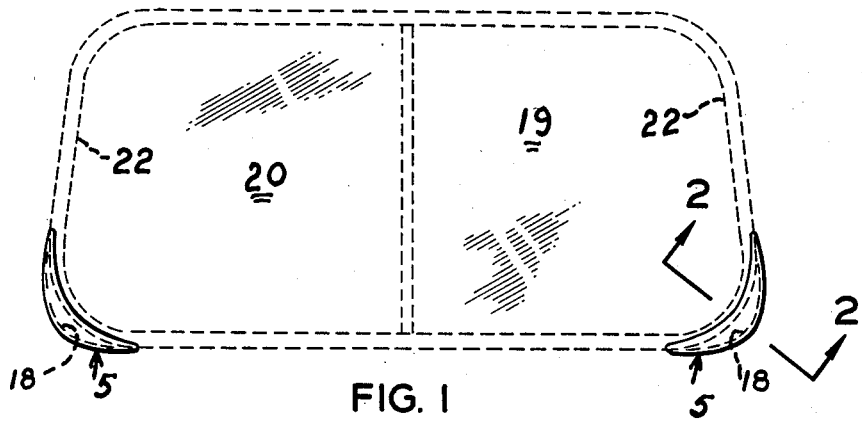
Figure 1 is an elevational view of a pair of the devices as installed in a rear window opening and illustrating in dotted lines, a glass-run channel supporting a pair of panes of glass.

The reference numeral 5 indicates, as a whole, the device, per se, which is substantially crescent shaped in general configuration. The device 5 comprises a pair of comparatively thin substantially flat plates 6 and 7 joined together in face to face relation, preferably by spot welding as at 8. The outermost edges 9 and 10 are arcuately formed to substantially conform to the configuration of the radius of the pinch weld of the lower end corner of a truck window opening. It is to be understood that the radius may be varied to be larger or smaller in order to fit a particular pinch weld since the configuration of truck rear windows varies. The inner edges 11 opposite the edges 9 and 10 are formed on a larger or longer radius for the purpose more fully explained hereinbelow.

Figure 2:
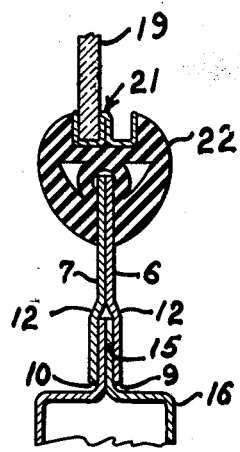
Figure 2 is a vertical cross sectional view taken substantially along line 2—2 of Fig. 1 illustrating the manner of connecting the device.
Figure 3:
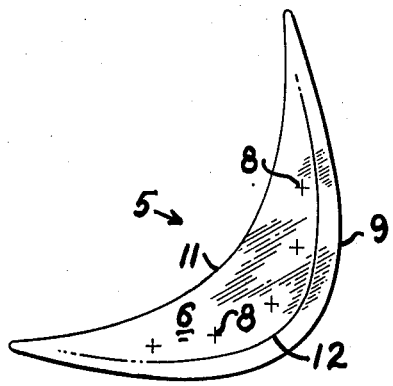
Figure 3 is an elevational view of the device, per se.

The plates 6 and 7 each have a portion adjacent their respective edges 9 and 10 formed in spaced-apart parallel relation from a radius lying in spaced relation with the edges 9 and 10 as indicated generally by the line 12 (Fig. 3). The spacing between the plate edges 9 and 10 is preferably such that the pinch weld 15 of the window opening of the truck cab 16 may be closely received therebetween (Fig. 2).

Obviously the device 5 may be made of one piece of suitable material and a groove formed in its outermost edge for receiving the pinch weld 15 therein.

In carrying out the installation as shown in Fig. 1, the conventional window glass and its supporting frame rubber, not shown, is removed from the truck window opening. One of the devices 5 is placed within each lower end corner of the window opening with the spaced-apart edges 9 and 10 of the plates 6 and 7 enveloping the pinch weld as shown in Fig. 2 and as indicated by the dotted line 18 (Fig. 1). With the device 5 thus installed in the radius of a corner they are designed for, it may be seen from Fig. 1 that the edges 9 and 10 converging with the edges 11 at each end of the device merge with the inner periphery or edge of the pinch weld 15 and form substantially a continuous line describing substantially a rectangular opening having rounded corners or corners with a comparatively large radius. Thus it appears evident that the outer spaced-apart edges 9 and 10 of the device must be formed on a radius substantially equal with relation to the radius of the pinch weld they are intended for, while the inner edges 11 may be made in any desired larger radius which will receive the glass-run channel rubber without binding the same and yet merge with the line of the window opening defined by the pinch weld. Glass panes 19 and 20 are placed within a conventional glass-run channel 21 which is carried by a conventional rubber channel or weatherstrip 22. The channel 22 is installed on the pinch weld of the window opening and the inner edge 11 of the devices 5 in a conventional manner, as illustrated in Fig. 2, forming a water tight seal with the pinch weld and the devices 5. The glass run channel 21 permits the glass 20 to slide horizontally by the glass 19.

Figure 4:
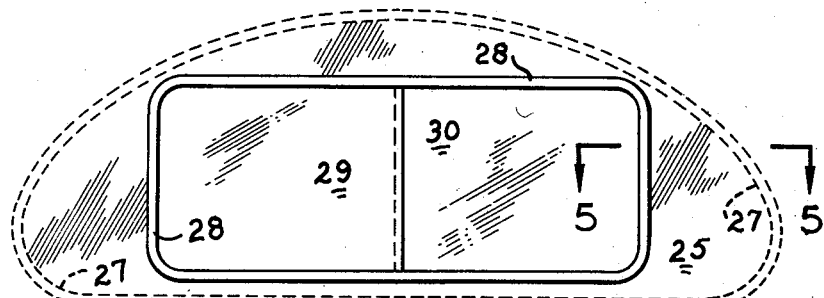
Figure 4 is a similar view to Fig. 1 illustrating an alternate embodiment of the device installed in a different shaped window opening, the glass-run channel being shown in solid lines.
Figure 5:
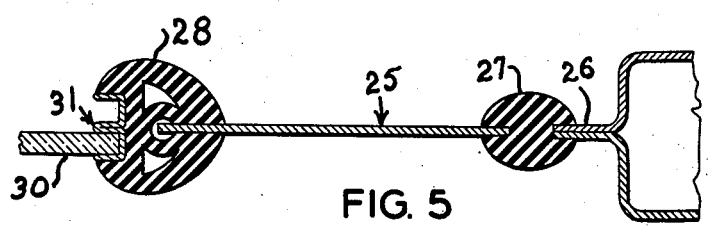
Figure 5 is a horizontal cross sectional view taken substantially along line 5—5 Fig. 4 illustrating the manner of connecting the device.

An alternate embodiment of the invention is illustrated in Fig. 4, which is designed generally for window openings having arcuately formed ends and a curved top edge. A section of sheet material is cut or trimmed to form an adapter 25 which is vertically disposed within the window opening with its outermost edge in relatively close spaced-apart relation with the edge of the pinch weld 26. The adapter 25 is held in this position by a conventional rubber channel 27 (Fig. 5) and as shown in dotted lines Fig. 4. Centrally the adapter 25 is provided with a substantially rectangular opening having corner radii which will permit the installation of a conventional rubber weather-strip channel 28, similar to the channel 22, without binding the same. Similarly glass panes 29 and 30 are slidably installed in the channel 28 by a glass-run channel 31.

Figure 6:
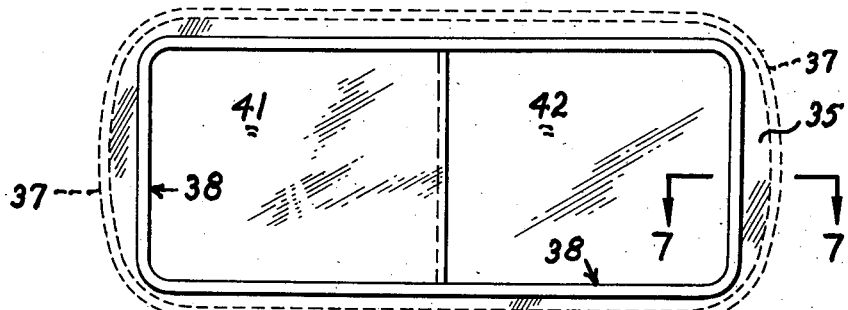
Figure 6 is a view similar to Fig. 4 illustrating another alternate embodiment installed in a different shaped window opening.
Figure 7:
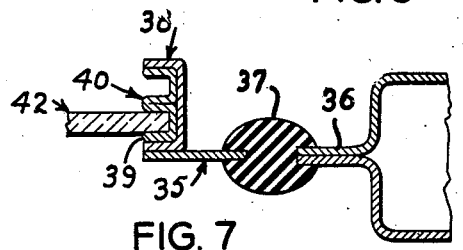
Figure 7 is a horizontal cross sectional view similar to Fig. 5 taken substantially along line 7—7 of Fig. 6.

An alternate of the adapter is shown in Fig. 6 which is designed for window openings having arcuately formed ends and comprises a single sheet of material cut or trimmed to form an adapter 35 which is vertically disposed within the window opening with its outermost edge in relatively close spaced-apart relation with the edge of the pinch weld 36 (Fig. 7). The adapter 35 is held in this position by a conventional rubber channel 37 (Figs. 6 and 7). Centrally the adapter 35 is provided with a substantially rectangular opening as large as is practical, and having corner radii which will permit the installation of a glass-run channel 38. The channel 38 is substantially U-shaped cross sectionally, and has one of its legs 39 rigidly connected flatly to the outermost edge of the adapter 35. The channel 38 is preferably installed on the outwardly disposed side of the adapter 35 with the leg 39 substantially even with the innermost edge of the adapter 35 as seen in Fig. 7, for the purpose of insuring a water tight installation. Obviously any water, not shown, collecting in the unoccupied portion of the glass-run channel 40, on the lower horizontally disposed section, will tend to run or spill out of the channel 40 and run down the outward side of the adapter 35 away from the window.

It is preferred that conventional caulking compound, not shown, be inserted into the spaced-apart edges of the adapters 5 and the various connecting rubber channels to maintain a water tight connection. The channel 38 is preferably large enough to hold a glass-run channel 40 therein for slidably supporting glass panes 41 and 42.

Obviously three panes of glass may be installed in place of only two as shown in Figs. 1, 4 and 6, by the use of conventional triple glass-run channels, not shown, if desired.

Obviously the invention is susceptible to some change or alteration without defeating its practicability, and I therefore do not wish to be confined to the preferred embodiment shown in the drawings and described herein, further than I am limited by the scope of the appended claim.

I claim:

A sliding window glass-run channel adapter for the corners of a truck window opening circumferentially defined by a pinch weld, including: a pair of substantially flat members rigidly connected flatly in face to face relation, said members having an arcuately outwardly curved edge and an oppositely disposed arcuately inwardly curved edge, the thickness of said inwardly curved edge being substantially equal with relation to said pinch weld, the opposing ends, respectively, of said curved edges converging at opposite ends, respectively, of said members, said outwardly curved edges disposed in parallel spaced-apart relation for enveloping a radial corner portion of said pinch weld and contactually merging the opposing ends and inwardly disposed edge of said members with the line of the inner peripheral edge of said pinch weld.

References Cited in the file of this patent

UNITED STATES PATENTS

| | | |
|---|---|---|
| 1,700,502 | Levan | Jan. 29, 1929 |
| 2,107,773 | Axe | Feb. 8, 1938 |
| 2,163,566 | Blessin | June 20, 1939 |
| 2,572,124 | Eichner | Oct. 23, 1951 |
| 2,609,896 | Potchen | Sept. 9, 1952 |
| 2,701,162 | Kliger | Feb. 1, 1955 |

FOREIGN PATENTS

| | | |
|---|---|---|
| 252,541 | Great Britain | June 3, 1926 |
| 578,362 | Great Britain | June 25, 1946 |
| 672,360 | Great Britain | May 21, 1952 |